United States Patent Office 3,825,541
Patented July 23, 1974

3,825,541
(±)-9-(β-(3-α-AMINO - 2α - HYDROXY) CYCLO-
PENTYL) - 6-SUBSTITUTED-PURINES AND
DERIVATIVES THEREOF
Robert Vince, St. Paul, Minn., assignor to The Regents of
the University of Minnesota
Filed Jan. 26, 1972, Ser. No. 220,890
Int. Cl. C07d 57/38
U.S. Cl. 260—253                               4 Claims

ABSTRACT OF THE DISCLOSURE

A new class of chemical compounds, (±)-9-[β-(3α-amino-2α-hydroxy)cyclopentyl] - 6 - substituted - purines having the general formula:

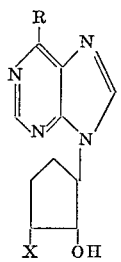

Figure 1:
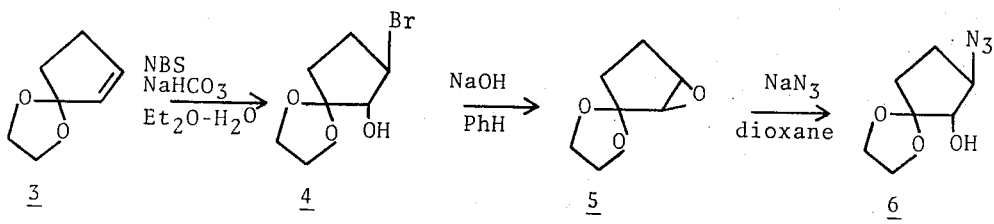
Figure 1:
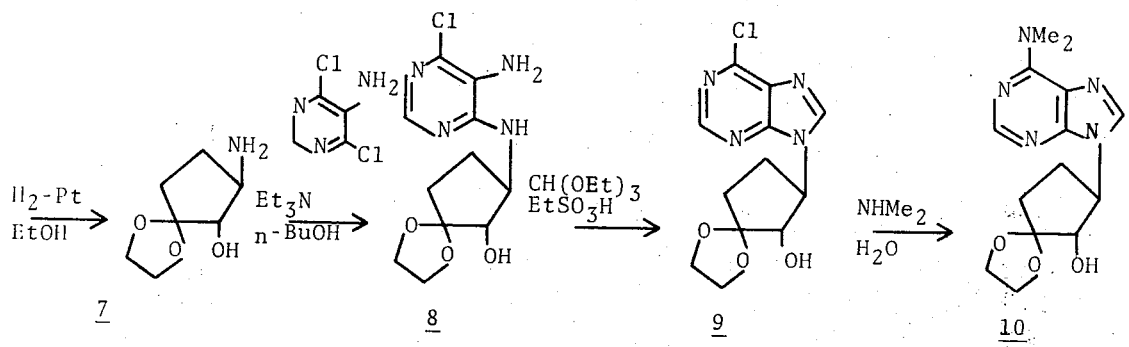
Figure 1:
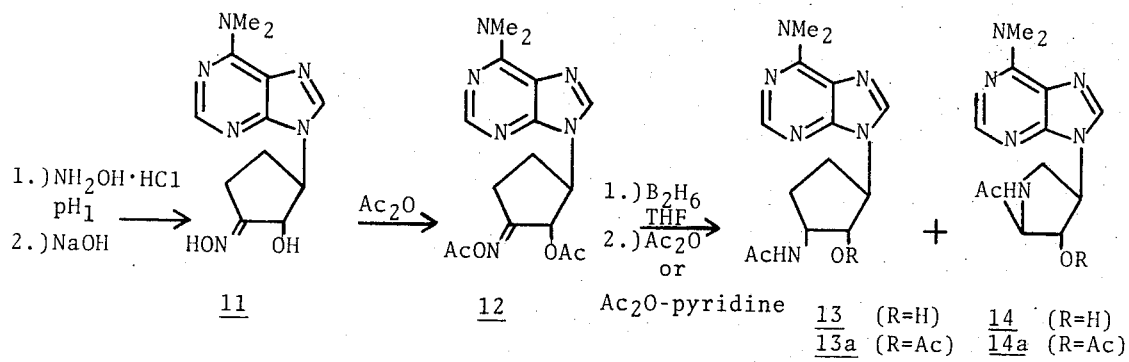

wherein R is a substituent selected from the group consisting of hydroxyl, mercapto, methyl mercapto, halogen (chlorine, bromine, fluorine and iodine) and substituted amino:

wherein R' and R" may be the same or different substituents and are selected from the group consisting of hydrogen, methyl, ethyl, propyl and phenyl; X is an amino radical or amino acid; and acid salt derivatives of the same, such as acetic, hydrochloric, sulfuric, etc.; and the method of preparation thereof. The intermediate (±)-9-[β-(3α-amino - 2α - hydroxy)cyclopentyl] - 6 - dimethyl-aminopurine, or any of its corresponding 6-substituted derivatives, leads to the preparation of two diasterioisomers when condensed with the appropriately blocked L-amino acid. The separation of these diasterioisomers results in the isolation of antimicrobial and antitumor agents.

---

The invention described herein was made in the course of work under a grant or award from the Department of Health, Education, and Welfare.

This invention relates to a new class of chemical compounds, (±)-9-[β-(3α-amino-2α-hydroxy)cyclopentyl]-6-substituted-purines having the general formula:

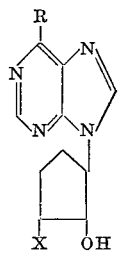

wherein R is a substituent selected from the group consisting of hydroxyl, mercapto, methyl mercapto, halogen (chlorine, bromine, fluorine and iodine) and substituted amino:

wherein R' and R" may be the same or different substituents and are selected from the group consisting of hydrogen, methyl, ethyl, propyl and phenyl; X is an amino radical or amino acid; and acid salt derivatives of the same, such as acetic, hydrochloric, sulfuric, etc. Although the invention is described in detail with reference to the dimethyl substituted aminopurine and selected derivatives thereof, it will be readily understood that the same general flow scheme may be followed to produce compounds with different radicals substituted in the 6-position and different derivatives thereof.

DESCRIPTION OF THE PRIOR ART

Puromycin, an antibiotic with antitumor activity [B. L. Hutchings, Chem. Biol. Purines, CIBA Found. Symp., 1956 777 (1957)] has been found to inhibit protein biosynthesis in a wide variety of organisms. However, since puromycin is a ribonucleoside antibiotic, it is easily cleaved hydrolytically or enzymatically in vivo thus lessening its effect as a chemotherapeutic agent. [P. M. Rull, H. Weinfeld, E. Carroll, and G. B. Brown, J. Biol. Chem., 220 439 (1956) and B. R. Baker, "Design at Active-Site-Directed Irreversible Enzyme Inhibitors. The Organic Chemistry of the Active Site," John Wiley and Sons, Inc., New York, N.Y., 1967, pp. 79, 93.] Toxic manifestations, including renal lesions, have precluded the use of puromycin in the treatment of human or animal infectious diseases or neoplasms. [D. Nathans in "Antibiotics I, Mechanism of Action," D. Gottlieb and P.D. Shaw, Eds., Springer-Verlag, New York, N.Y., 1967, pp. 259–277.] The nephrotic syndrome results from the formation of toxic puromycin metabolites formed after administration of the antibiotic.

SUMMARY OF THE INVENTION

The intermediate (±)-9-[β-(3α-amino-2α-hydroxy)cyclopentyl]-6-dimethylaminopurine leads to the production of puromycin analogs which are hydrolytically stable and are completely devoid of nephrotic syndrome in test animals. One such derivative is 6-dimethylamino-9-{R-[2R-hydroxy-3R-(p-methoxyphenyl - L - alanylamino)]cyclopentyl}-purine. Preliminary studies have established that this product is as effective as puromycin itself in inhibiting bacterial growth. Testing results from the Cancer Chemotherapy National Service Center have demonstrated its ability to inhibit the growth of tumor cells.

The compound operates by inhibiting protein biosynthesis in growing cells. These cells (bacterial, protozoan, cancer, etc.) die from a lack of protein. As a result, the drug can be used to treat infectious diseases. The compounds represent a new concept in the design of puromycin analogs. The molecule retains all of the moieties necessary for growth inhibition, and at the same time it lacks the moieties which are responsible for toxicity. The greatest advantage lies in the use of these drugs against non-bacterial infections such as protozoan and trypanosome diseases, since most antibiotics are not active against non-bacterial organisms.

DETAILED DESCRIPTION OF THE
INVENTION

Figure 1A:
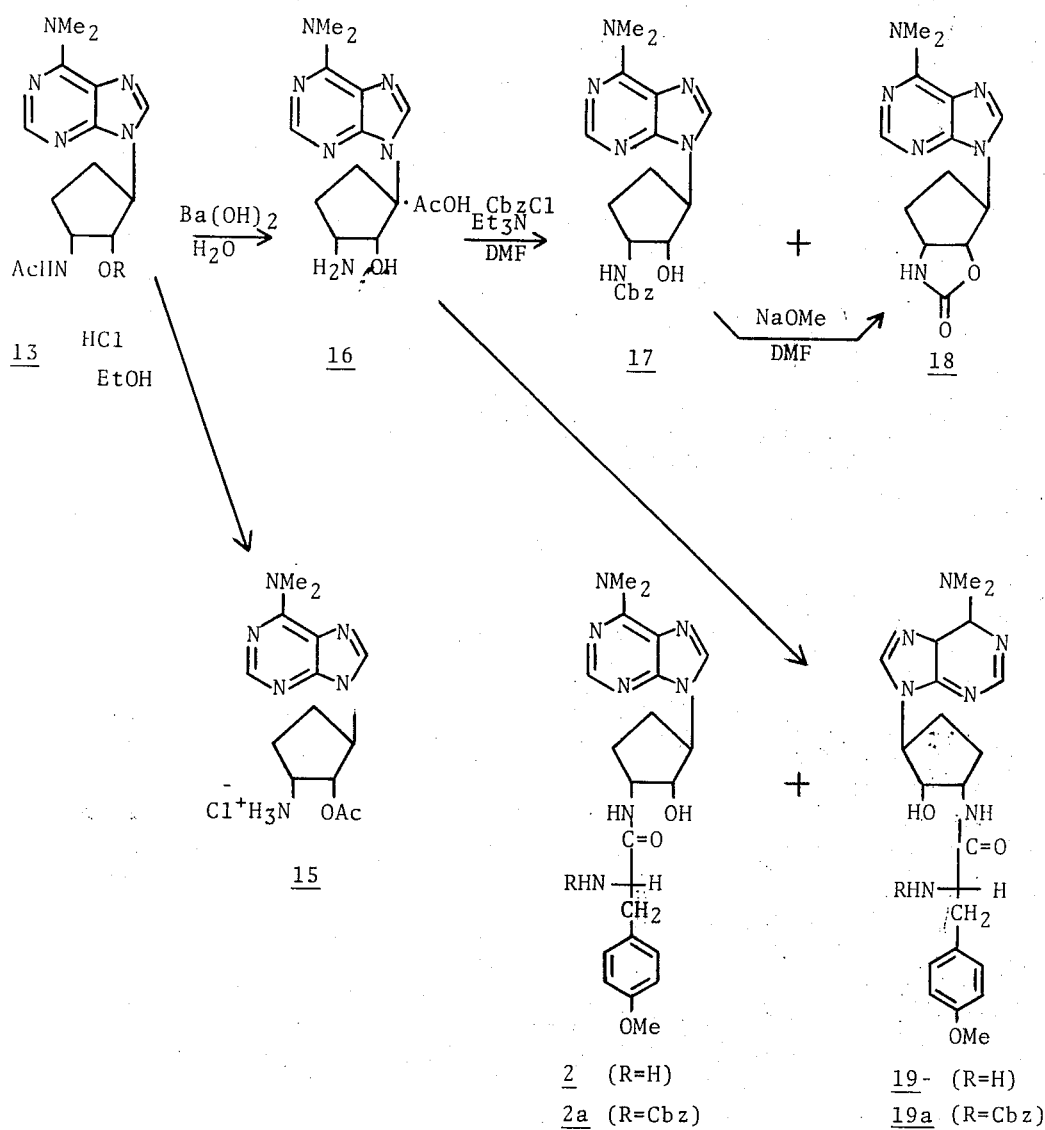

FIGS. 1 and 1A together represent a flow sheet leading to (1)-9-[β-(3α-amino-2α-hydroxy)cyclopentyl]-6-substituted-aminopurines and derivatives thereof.

The carbocyclic analog of puromycin 2 was synthesized by the route shown in FIGS. 1 and 1A (Structures 3–18 depict only one enantiomer of the racemic form actually obtained.) Cyclopent-2-enone ethyleneketal 3 was reacted with N-bromosuccinimide in ether-water by a modification of the procedure of Guss and Rosenthal in which

was used to buffer the reaction mixture. Cyclopent-2-enone ethyleneketal 3 (37.85 g., 0.300 mole), N-bromosuccinimide (53.40 g., 0.300 mole), NaHCO₃ (4.20 g., 50.0 mmoles), Et₂O (240 ml.), and H₂O (240 ml.) were stirred vigorously for 6.5 hours, at which time all of the solid had disappeared and the pH was approximately 7. The aqueous layer was saturated with NaCl, and the Et₂O layer then separated. The aqueous layer was extracted with additional Et₂O (2× 100 ml.). The combined Et₂O layers were washed with saturated NaCl and dried (CaSO₄). When bromohydrin 4 was immediately treated with NaOH in refluxing benzene, epoxide 5, 6-oxabicyclo[3.1.1]hexan-2-one ethyleneketal, was formed in 73% yield (from 3), as a stable colorless liquid. The epoxide was opened with sodium azide in dioxane by the method of Vander Werf et al., and the resulting azide reduced catalytically to crystalline trans-3-amino-2-hydroxycyclopentanone ethyleneketal 7 in 76% yield (from 5). A solution of 5 (2.84 g., 20.0 mmoles) in dioxane (40 ml.) was brought to reflux. A solution of sodium azide (1.63 g., 25.0 mmoles) in H₂O (10 ml.) was added to the refluxing solution over 1.0 hour. The resulting mixture was refluxed with vigorous stirring for 48 hours. The dioxane layer was separated from the aqueous layer, and the aqueous layer was extracted with additional dioxane (50 ml.) The combined dioxane layers were washed with saturated NaCl (50 ml.) and dried (CaSO₄). This material was dissolved in absolute EtOH (75 ml.) and shaken with platinum oxide (100 mg.) under hydrogen (50 p.s.i.) for 20 hours. After filtration, the EtOH was evaporated, leaving pale yellow solid (2.91 g.) which IR showed to contain no azide. Crystallization from PhH gave 7 as pale yellow crystals (2.41 g.), m.p. 97–98°.

The purine moiety was formed via a standard method. Condensation of 7 with 5-amino-4,6-dichloropyrimidine, followed by ring-closure of the resulting crude pyrimidine 8 with triethylorthoformate in the presence of ethane sulfonic acid gave the 6-chloropurine 9, trans-3-(6-Chloro-9-purinyl) - 2 - hydroxycyclopentanone Ethyleneketal, in 84% yield (from 7) as follows: A solution of 7 (14.04 g., 88.20 mmoles), 5-amino-4,6-dichloropyrimidine (14.47 g., 88.20 mmoles), and triethylamine (37 ml., 265 mmoles) in n-BuOH (160 ml.) was refluxed under nitrogen for 44 hours. Evaporation (50°, 0.2 mm.) left a brown oil (42 g.) containing 8 which was shaken with triethylorthoformate (200 ml.) for a few minutes. The white solid Et₃NH⁺Cl⁻ (10.82 g., 89%) did not dissolve and was removed by filtration. Ethane sulfonic acid (1.0 g.) was added to the filtrate, and it was stirred at ambient temperature for 15 hours. At this time solid had formed. Hexane (200 ml.) was added, and the mixture was cooled. The tan solid was collected and washed with hexane (100 ml.), giving crude 9 (24.42 g.). Crystallization from EtOAc (500 ml.) gave tan needles (22.03 g.), m.p. 165–167°.

The 6-dimethylaminopurine 10, trans-3-(6-Dimethylamino-9-purinyl)-2-hydroxycyclopentanone Ethyleneketal, was formed in 75% yield when 9 was treated with refluxing aqueous dimethylamine. A solution of 9 (3.85 g., 13.0 mmoles) in aqueous 25% dimethylamine (100 ml.) was refluxed 3.0 hours. The solution was concentrated to 20 ml. and extracted with EtOAc (3× 100 ml.). The EtOAc extract was dried (CaSO₄) and concentrated to 50 ml. White crystals of 10 were collected (2.99 g.), m.p. 156–158°.

Other substitutions may be made in the -6- position according to the procedures described in the papers of H. J. Schaeffer and R. Vince, Journal of Medicinal Chemistry, 8, 33, (1965) and H. J. Schaeffer, D. Vogel and R. Vince, Journal of Medicinal Chemistry, 8, 502, (1965). Typical alternative substituents include hydroxyl, mercapto, methyl mercapto, chlorine, bromine, fluorine, iodine and amino groups other than the di-methyl amino radical illustrated. The substituents of the di-substituted amino group may be the same or different and include hydrogen, methyl, ethyl and phenyl radicals.

Oxime 11, trans-3-(6-Dimethylamino-9-purinyl)-2-hydroxycyclopentanone Oxime, was synthesized directly from 10 under what appear to be unique conditions for oxime-formation. To a stirred mixture of 10 (10.00 g., 32.8 mmoles), hydroxylamine hydrochloride (11.38 g., 164 mequiv.), and H₂O (140 ml.) was added 2 N HCl (approximately 28 ml.) dropwise until the pH was 1.0 (measured on a meter), and all solid had dissolved. The solution was stirred at 70–75° for 3.0 hours. The pH of the hot solution was then adjusted to 6.5 with 6 N NaOH, and white solid began to precipitate. The mixture was cooled (5°) for several hours. The solid was collected, washed with H₂O (50 ml.), and air-dried, giving 11 (8.95 g., 99%), m.p. 202–204° dec; tlc indicates a mixture of syn and anti oximes. Since attempted separation by chromatography or recrystallization resulted in considerable losses, the mixture was acetylated without separation, a solution of 11 (8.95 g., 32.4 mmoles) in Ac₂O (200 ml.) was stirred at 60–65° for 4.25 hours. Evaporation left a tan solid which was crystallized from EtOAc, giving a chromatographically homogeneous diacetyl derivative 12 as white crystals (8.16 g., 70%), m.p. 152–154°.

The O-acetyloxime 12, trans-2-Acetoxy-3-(6-dimethylamino-9-purinyl)cyclopentanone O-Acetyloxime, was reduced to a mixture of aminoalcohols with diborane in tetrahydrofuran (THF) by a modification of the procedure used by Feuer and Braunstein for the conversion of cyclohexanone O-acetyloxime to cyclohexylamine. To a stirred, cooled (0–5°) solution of 12 (4.37 g., 12.1 mmoles) in dry THF (100 ml.) was added a 1M solution of BH₃ in THF (44.0 ml., approximately 130 mequiv. hydride) over a period of 1.0 hour under a nitrogen atmosphere. The solution was stirred for an additional 3.0 hours at 0–5°, and then for 12.0 hours at ambient temperature. After cooling the reaction solution (ice bath), H₂O (8.3 ml.) was added. The THF was evaporated (25°, 0.5 mm.), and the residue stirred with 2N HCl (110 ml.) at ambient temperature for 3.5 hours. After evaporation, the residue was dissolved in MeOH (50 ml.) and passed slowly through a column of 100 ml. of Amberlite IRA–400 resin (OH⁻) packed in MeOH. The basic eluent (500 ml.) was evaporated, leaving a yellow, gummy solid (3.26 g.), which TLC indicated to be largely a mixture of aminoalcohols and numerous minor contaminants. The amino-alcohols could not be separated by preparative tlc and appeared to carbonate on standing. This gummy solid was dissolved in Ac₂O and stirred at 60° for 1.75 hours. Evaporation left a brown glass (3.74 g.) which was chromatographed on a column of silica gel (200 g.) packed in CHCl₃. Elution with 2% MeOH-CHCl₃ (2 l.) gave a pale yellow glass (290 mg.), which crystallized from EtOAc-hexane to a white solid (64 mg.), m.p. 181–183°. Elution with 3% MeOH-CHCl₃ (3 l.) gave 13,(1)-9-[β-(3α-Acetamido - 2α - hydroxy)cyclopentyl] - 6 - dimethylaminopurine, as a pale yellow glass (2.09 g.), which crystallized from EtOAc (1.65 g., 45% from 12), m.p. 151–152°.

Continued elution with 3% MeOH—CHCl₃ (1.51) gave fractions containing both 13 and 14 (124 mg., 3%), followed by fractions containing only 14, (1)-9-[α-(3α-Acetamido-2β-hydroxy)cyclopentyl] - 6 - dimethylaminopurine, as an amorphous white solid (247 mg.). Crystallization of this solid from EtOAc gave 14 as white crystals (159 mg., 4%), m.p. 171–171.5°.

The diacetyl derivatives 13a and 14a were obtained when the mixture from the diborane reduction of 1.00 g. (2.78 mmoles) of 12 was stirred in Ac₂O (5 ml.)-pyridine (10 ml.) at ambient temperature for 18 hours.

Evaporation left a brown glass (800 mg.) which was chromatographed on a column of silica gel (50 g.) packed in CHCl$_3$. Elution with 1% MeOH-CHCl$_3$ (700 ml.) gave 14a as a colorless glass (154 mg.). Crystallization from EtOAc- hexane gave white solid (32 mg., 3%), m.p. 207.5–210° dec.

Elution with 2% MeOH-CHCl$_3$ (850 ml.) gave a yellow glass which crystallized from EtOAc giving 13a as tan crystals (377 mg., 39%), m.p. 194.5–196°.

The N-acetyl derivative 13 (730 mg., 2.40 mmoles) was refluxed in a saturated aqueous solution of Ba(OH)$_2$ (approximately 0.5N, 40 ml.) for 3.0 hours. The solution was diluted with EtOH (50 ml.) and treated wtih excess Dry Ice. The BaCO$_3$ was removed by filtration through Celite. Evaporation left a white solid (740 mg.), m.p. 180–182° dec., which was resolidified from EtOH-Et$_2$O, giving 16, Acetic Acid Salt of ($\pm$) 9-[$\beta$-(3$\alpha$-Amino-2$\alpha$-hydroxy)cyclopentyl]-6-dimethyl aminopurine, as a white powder (685 mg., 89%), m.p. 184–186° dec.

The procedure of Baker and Joseph was used to prepare the 2′,3′-carbamate of the puromycin aminonucleoside 18, ($\pm$)-9-[$\beta$-(3′$\alpha$-Amino-2′$\alpha$-hydroxy)cyclopentyl]-6-dimethylaminopurine 2′, 3′-Carbamate. A solution of 16 (100 mg., 0.310 mmole) and triethylamine (0.13 ml., 0.93 mmole) in dimethyl formamide (DMF) (5 ml.) was cooled to 5°. Carbobenzoxy chloride (0.05 ml., approximately 0.5 mmole) was added, and the solution stirred at ambient temperature for 1.0 hour. H$_2$O (20 ml.) was added and the oil which formed was extracted into CHCl$_3$ (3× 20 ml.). The CHCl$_3$ extracts were dried (CaSO$_4$) and evaporated, leaving a colorless glass (96 mg.), which TLC in solvent B showed to be a mixture of 17 and 18 in approximately equal amounts. When the mixture of 17 and 18 was treated with NaOMe in DMF as described below, 18 was isolated in 74% yield (from 16).

The carbocyclic aminonucleoside analog 16 was coupled to N-benzyloxycarbonyl-p-methoxyphenyl - L - alanine by two methods: (A) the dicyclohexylcarbodiimide-N-hydroxysuccinimide method and (B) a modification of the mixed anhydride method suggested by Anderson et al. The resulting carbobenzoxy blocked diastereomers 2a, 9{R-[3R-(Benzyloxycarbonyl - p - methoxyphenyl - L - alanylamino)-2R-hydroxy]cyclopentyl} - 6 - dimethylaminopurine, and 19a, 9-{S-[3S-(Benzyloxycarbonyl - p - methoxyphenyl-L-alanylamino) - 2S - hydroxy]cyclopentyl}-6-dimethylaminopurine, (97% by method A, 77% by method B) could not be separated. Alternatively, other amino acid derivatives of 16 may be prepared by analogous procedures.

Method A

A solution of 16 (145 mg., 0.450 mmole) in MeOH was passed slowly through a column of 10 ml. of Amberlite IRA-400 resin (OH$^-$) packed in MeOH. Evaporation left the free amine as a white solid (118 mg., 0.450 mmole), m.p. 153–154°, which was dissolved immediately in DMF (5 ml.), along with N-benzoyloxycarbonyl-p-methoxyphenyl-L-alanine (155 mg., 0.472 mmole) and N-hydroxysuccinimide (54.3 mg., 0.472 mmole). The solution was cooled to 0°, and DCC (97.4 mg., 0.472 mmole) was added. After stirring at 0° for 30 minutes, the solution was allowed to stir at ambient temperature for 20 hours. The mixture was filtered, the dicyclohexylurea washed with EtOAc (20 ml.), and the combined filtrate evaporated. A solution of the residue in EtOAc (5 ml.) was cooled at 0° and then filtered. The filtrate was diluted to 15 ml. with EtOAc, extracted with H$_2$O (2.5 ml.), then one-half saturated NaHCO$_3$ (2.5 ml.), then H$_2$O (2× 5 ml.). Evaporation of the dried EtOAc solution left a mixture of 2a and 19a as a white solid foam (250 mg., 0.436 mmole).

Method B

A solution of triethylamine (61.3 mg., 0.606 mmole) in dry THF (10 ml.) was cooled to −10°. Ethyl chlorocarbonate (72.4 mg., 0.667 mmole) was added. The solution was stirred for 1 minute, and then N-benzyloxycarbonyl-p-methoxyphenyl-L-alanine (200 mg., 0.606 mmole) was added and the mixture stirred at −10° for 10 minutes. A sample of the free amine obtained by resin treatment of 16 as in method A (159 mg., 0.606 mmole) was dissolved in DMF, the solution cooled to −10° and added to the mixed anhydride. The resulting mixture was stirred at −10° for 1.0 hour and then stored at 4° for an additional 24 hours. The mixture was filtered, and the solid collected washed with additional DMF (5 ml.). Evaporation of the combined filtrates left a colorless glass which was triturated with H$_2$O (5 ml.), evaporated to dryness, and chromatographed to prep TLC on a plate developed in solvent C. Extraction of the major band with 20% MeOH—CHCl$_3$ (other bands were unreacted starting materials) gave a mixture of 2a and 19a as a solid foam (266 mg., 77%), R$_f$, IR, and NMR identical with the mixture obtained from method A.

The crude mixture of aminoalcohols resulting from the diborane reduction of 3.00 g. (8.32 mmoles) of 12 was reacted directly with the mixed anhydride of N-benzoyloxycarbonyl-p-methoxyphenyl-L-alanine in this manner, giving a mixture of 2a and 19a, after chromatography, in 30% yield (from 12); R$_f$, IR, NMR identical with the samples described above. The mixture of aminoalcohols from the reduction of 12 was also coupled to N-benzoyloxycarbonyl-p-methoxyphenyl-L - alanine by method A, giving a yield of 2a and 19a, after chromatography, comparable with the overall yield via 13 and 16. Following hydrogenolysis of the carbobenzoxy group, separation of diastereomers 2, 6 - Dimethylamino-9-{R-[2R-hydroxy-3R-(p - methoxyphenyl-L-alanylamino)]cyclopentyl}purine, and 19, 6 - Dimethylamino-9-{S-[2S-hydroxy-3S-(p - methoxyphenyl-L-alanylamino)]cyclopentyl}purine by chromatography was possible. A mixture of 2a and 19a prepared by method A (250 mg., 0.436 mmole) was dissolved in glacial AcOH (15 ml.) and shaken with 10% Pd-C (125 mg.) under hydrogen (1 atm.) for 10 minutes, by which time hydrogen uptake had ceased. The mixture was filtered through Celite and the Celite was washed with additional AcOH (10 ml.). Evaporation of the combined filtrate and wash (35°, 0.5 mm.) left a colorless glass. A solution of this glass in MeOH was passed slowly through a column of 10 ml. of Amberlite IRA-400 resin (OH$^-$) packed in MeOH. The basic MeOH eluent (250 ml.) was evaporated, leaving a mixture of 2 and 19 as a white solid (176 mg., 92%), m.p. 194–196°.

The diastereomers 2 and 19 were separated by prep TLC (50–70 mg. per plate) in solvent D. The two bands were each stirred for 18 hours with 20% MeOH-CHCl$_3$, filtered, and evaporated, giving almost quant recovery of the pure diastereomers as colorless glasses.

Hydrogenolysis of a mixture of 2a and 19a prepared by method B gave a 91% yield of 2 and 19. The two coupling methods resulted in samples of 2 and 19 with identical optical purities. The mass spectra of 2 and 19 are almost identical, differing slightly only in the relative intensities of some ions.

RESULTS AND DISCUSSION

Antimicrobial testing of diasteriomers 2 and 19 revealed that one isomer was completely inactive while the other exhibited growth inhibition on the same order of magnitude as puromycin. The absolute stereochemistry of the active isomer has tentatively been assigned that of structure 2 on the basis of its biological activity and in accordance with the stereochemistry of puromycin. The minimum inhibitory concentrations by a twofold serial dilution test in broth for puromycin and the carbocyclic analog 2, respectively, are as follows (mM.): *Staphylococcus aureus* (NRRL B–313), 0.244 and 0.244; *Bacillus subtilis* (NRRL B–545), 0.030 and 0.060; *Klebsiella pneumoniae* (NRRL B–117), 0.485 and 0.485; *Escherichia coli* (NRRL B-210) 0.060 and 0.120. A growth curve for *S. aureus* in the presence of different concentrations of puromycin or the carbocyclic compound shows a lag period with both compounds when the concentrations are lower than those required for complete inhibition. Such a lag period is consistent with the mechanism of action of puromycin since the antibiotic would be expected to be consumed as it is incorporated into the growing peptide chains.

The aminonucleoside 16 was tested for nephrotoxicity in rats at a dose of 33 mg./kg. under the same conditions that are required for puromycin aminonucleoside to cause severe nephrotic syndrome at a dose of 15 mg. No nephrotoxicity was observed even after 17 days of treatment with 16.

The novel puromycin analog 2 provides a molecule with the structural features required for puromycin-like antimicrobial activity. Thus, the ribofuranosyl ring can be replaced with the more hydrolytically stable cyclopentane ring without loss of activity. In addition, the removal of the hydroxymethyl moiety is not detrimental to activity and at the same time provides 2 with a resistance to kinase activity upon release of the aminonucleoside. This resistance to phosphorylation circumvents the nephrotic syndrome associated with puromycin aminonucleoside. This carbocyclic analog and others which are under preparation are being evaluated for *in vitro* inhibition of protein biosynthesis in an attempt to explore the requirements for binding to ribosomes. Preliminary studies with 2 and 19 on an *E. coli* ribosomal system are consistent with the antimicrobial activities.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. ($\pm$)-9-[$\beta$(3$\alpha$-Amino - 2$\alpha$ - hydroxy)cyclopentyl]-6-substituted-purine having the general formula:

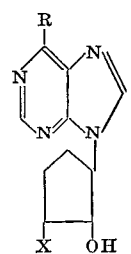

wherein R is a substituent selected from the group consisting of hydroxyl, mercapto, methyl mercapto, chlorine, bromine, fluorine and iodine and substituted amino:

wherein R' and R" may be the same or different substituents and are selected from the group consisting of hydrogen, methyl, ethyl, propyl and phenyl; X is amino and pharmaceutically acceptable acid salts of the same.

2. A purine according to Claim 1 where R' and R" are methyl.

3. An acid salt of a purine according to Claim 1 selected from the group consisting of acetic, hydrochloric and sulfuric acid salts.

4. An acid salt of an aminopurine according to Claim 2 selected from the group consisting of acetic, hydrochloric and sulfuric acid salts.

References Cited
UNITED STATES PATENTS
3,016,378    1/1962    Roch _____ 260—252

DONALD G. DAUS, Primary Examiner

A. M. T. TIGHE, Assistant Examiner

U.S. Cl. X.R.
260—252, 254, 340.9; 424—253

PO-1050
(5/69)

UNITED STATES PATENT OFFICE
CERTIFICATE OF CORRECTION

Patent No. 3,825,541          Dated July 23, 1974

Inventor(s) Robert Vince

It is certified that error appears in the above-identified patent and that said Letters Patent are hereby corrected as shown below:

In the heading of the drawings, the title should be:
(+)-9-[$\beta$-(3$\alpha$-AMINO-2$\alpha$-HYDROXY)CYCLOPENTYL]-6-SUBSTITUTED-PURINES AND DERIVATIVES THEREOF Column 2, line 16, 6- should be -6-.

Column 3, line 75, 8 should be underscored.

Column 4, line 1, 8 should be underscored.

Column 5, line 42, 9{R- should be 9-{R

Column 5, line 43, L should be italicized.

Column 7, line 12, 15 mg should be 15 mg/kg.

Signed and sealed this 5th day of November 1974.

(SEAL)
Attest:

McCOY M. GIBSON JR.
Attesting Officer

C. MARSHALL DANN
Commissioner of Patents